UNITED STATES PATENT OFFICE.

MAX WEILER, OF ELBERFELD, GERMANY, ASSIGNOR TO SYNTHETIC PATENTS CO., INC., OF NEW YORK, N. Y., A CORPORATION OF NEW YORK.

VIOLET COTTON-DYE.

1,244,149. Specification of Letters Patent. Patented Oct. 23, 1917.

No Drawing. Application filed September 22, 1915. Serial No. 52,077.

*To all whom it may concern:*

Be it known that I, MAX WEILER, doctor of philosophy, chemist, citizen of the German Empire, residing at Elberfeld, Germany, have invented new and useful Improvements in Violet Cotton-Dyes, of which the following is a specification.

My invention relates to the manufacture and production of new and valuable dyestuffs of the triphenylmethane series which are very suitable for printing purposes. They are obtained by treating with sulfonating agents the coloring matters having the following general formula:

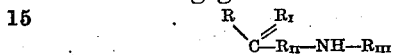

R and $R_I$ meaning aryl radicals of an aromatic oxycarboxylic acid, such as of salicylic or cresotinic acid, $R_{II}$ a divalent aryl radical, such as $—C_6H_4—$; and $R_{III}$ an aryl radical such as phenyl, naphthyl, benzyl, etc. These dyestuffs which I use as starting materials can be obtained by condensing aromatic aldehydes, such as benzaldehyde, with an aromatic oxycarboxylic acid, such as cresotinic acid, oxidizing and sulfonating the resulting condensation products and condensing the sulfonic acids with an aromatic amin which replaces the sulfonic group.

My new dyes, after being dried and pulverized are dark powders soluble in water, in some cases with difficulty, and generally with a violet coloration. They furnish violet shades on being printed upon cotton together with a chrome mordant.

In order to illustrate the new process more fully the following example is given the parts being by weight: 100 parts of the dye:

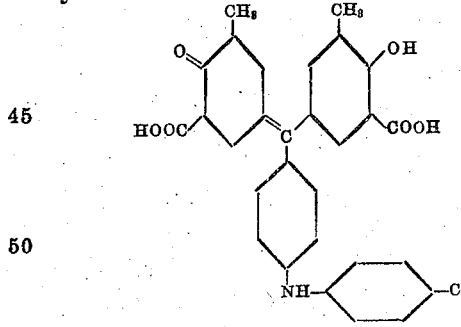

are dissolved in 250 parts of monohydrated sulfuric acid 80 parts of a 65 per cent. fuming sulfuric acid are added and the mixture is stirred until a test portion is soluble in water. Subsequently the mixture is stirred into ice water, the dye

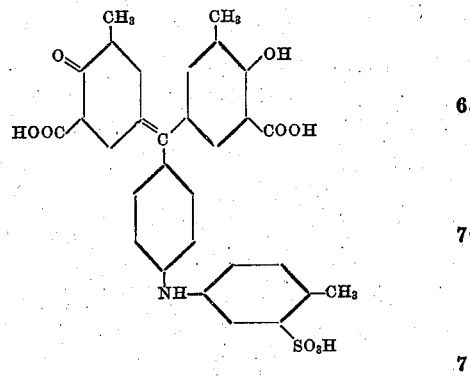

which has separated is filtered off and dried.

It is a dark brown powder easily soluble in water with a violet coloration, which turns red by the addition of a caustic soda solution. By printing it together with a chrome mordant on cotton bright violet shades are obtained.

Other of the above mentioned coloring matters are obtained in an analogous way, on starting *e. g.* from dyes which contain instead of the paratoluidin radical other radicals of aromatic amins *e. g.* the radicals of para- and meta-chloroanilin, 2-chloro-4-toluidin, asymmetric meta-xylidin, m-toluidin, beta-naphthylamin, etc.

I claim:—

1. The new dyes which can be obtained by sulfonating a triphenylmethane dye of the formula:

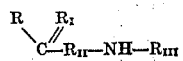

wherein R and $R_I$ stand for aryl radicals of an aromatic oxycarboxylic acid, $R_{II}$ represents a divalent aryl radical, and $R_{III}$ represents aryl, which dyes after being dried and pulverized are dark powders soluble in water generally with a violet coloration and furnishing on cotton violet shades on being printed together with a chrome mordant substantially as described.

2. The new dyes which are obtainable by sulfonating a triphenylmethane compound and which have most probably the formula:

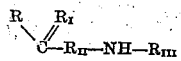

wherein R and $R_I$ stand for aryl radicals of an aromatic oxycarboxylic acid, $R_{II}$ represents a divalent aryl radical of the benzene series and $R_{III}$ represents a sulfo aryl, which dyes after being dried and pulverized are dark powders generally soluble in water with a violet coloration and furnishing on cotton violet shades on being printed together with a chrome mordant, substantially as described.

3. The new dyes which are obtainable by sulfonating a triphenylmethane compound and which have most probably the formula:

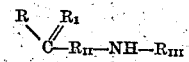

wherein R and $R_I$ stand for aryl radicals of an aromatic oxycarboxylic acid of the benzene series, $R_{II}$ represents a divalent aryl radical of the benzene series and $R_{III}$ represents a sulfo aryl, which dyes after being dried and pulverized are dark powders generally soluble in water with a violet coloration and furnishing on cotton violet shades on being printed together with a chrome mordant, substantially as described.

4. The new dyes which are obtainable by sulfonating a triphenylmethane compound and which have most probably the formula:

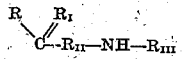

wherein R and $R_I$ stand for aryl radicals of an oxycarboxytoluene, $R_{II}$ represents a divalent aryl radical of the benzene series and $R_{III}$ represents a sulfo aryl, which dyes after being dried and pulverized are dark powders generally soluble in water with a violet coloration and furnishing on cotton violet shades on being printed together with a chrome mordant, substantially as described.

5. The new dyes which are obtainable by sulfonating a triphenylmethane compound and which have most probably the formula:

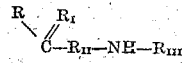

wherein R and $R_I$ stand for aryl radicals of an oxycarboxytoluene, $R_{II}$ represents a divalent aryl radical of the benzene series and $R_{III}$ represents a sulfoaryl of the benzene series, which dyes after being dried and pulverized are dark powders generally soluble in water with a violet coloration and furnishing on cotton violet shades on being printed together with a chrome mordant, substantially as described.

6. The new dye having in a free state most probably the formula:

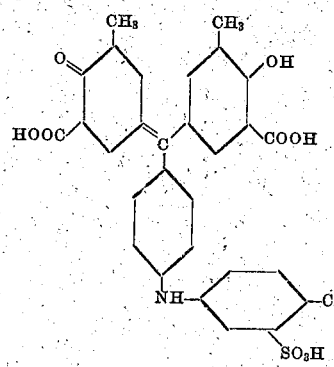

which is after being dried and pulverized a brown powder soluble in water with a violet coloration and furnishing bright violet shades on being printed upon cotton together with a chrome mordant, substantially as described.

In testimony whereof I have hereunto set my hand in the presence of two subscribing witnesses.

MAX WEILER. [L. S.]

Witnesses:
ALBERT NUFER,
FRANCES NUFER.